(12) United States Patent
Kroemer et al.

(10) Patent No.: US 8,396,337 B2
(45) Date of Patent: Mar. 12, 2013

(54) RING RESONATOR BASED OPTICAL ISOLATOR AND CIRCULATOR

(75) Inventors: Herbert Kroemer, Santa Barbara, CA (US); John E. Bowers, Santa Barbara, CA (US); Ming-Chun Tien, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 270 days.

(21) Appl. No.: 12/827,733

(22) Filed: Jun. 30, 2010

(65) Prior Publication Data
US 2012/0002914 A1  Jan. 5, 2012

(51) Int. Cl.
*G02B 6/42* (2006.01)
(52) U.S. Cl. ........................................................ 385/27
(58) Field of Classification Search ...................... 385/27
See application file for complete search history.

(56) References Cited

U.S. PATENT DOCUMENTS

| | | | | |
|---|---|---|---|---|
| 7,215,848 | B2* | 5/2007 | Tan et al. | 385/32 |
| 8,009,943 | B2* | 8/2011 | Bratkovski et al. | 385/16 |
| 2005/0169582 | A1* | 8/2005 | Tan et al. | 385/50 |
| 2008/0267557 | A1* | 10/2008 | Wang et al. | 385/16 |
| 2010/0238536 | A1* | 9/2010 | Hu et al. | 359/280 |
| 2012/0081197 | A1* | 4/2012 | Park et al. | 333/235 |

OTHER PUBLICATIONS

Fujita et al., "Waveguide optical isolator based on Mach—Zehnder interferometer," Applied Physics Letters 76, 2158-2160 (2000).
Kono et al., "Nonreciprocal microresonators for the miniaturization of optical waveguide isolators," Opt. Express 15, 7737-7751 (2007).
Mino et al., "Completely Bi-substituted iron garnet (BIG) films prepared by electron cyclotron resonance (ECR) sputtering," Jpn. J. Appl. Phys. 1, Regul. Pap. Short Notes 31, 1786-1792 (1992).
Soo Lee et al., "Bidirectional wavelength-selective optical isolator," Electron. Lett. 37, 910-912 (2001).
Sang-Yeob et al., "Integrating yttrium iron garnet onto nongarnet substrates with faster deposition rates and high reliability," Applied Physics Letters 87, 121111 (2005).
Shimizu et al., "Fabrication and characterization of an InGaAsP/InP active waveguide optical isolator with 14.7 dB/mm TE mode nonreciprocal attenuation," J. Lightwave Technol. 24, 38-43 (2006).
Shintaku et al., "Ce-substituted yttrium iron garnet films prepared on Gd3Sc2Ga3O12 garnet substrates by sputter epitaxy," Applied Physics Letters 71, 1640-1642 (1997).
Shoji et al., "Enhancement of magneto optic effect in optical isolator with GaInAsP guiding layer by selective oxidation of AlInAs," Jpn. J. Appl. Phys. 1, Regul. Pap. Short Notes Rev. Pap. 43, 590-593 (2004).
Wallenhorst et al., "Enhancement of the nonreciprocal magneto-optic effect of TM modes using iron garnet double layers with opposite Faraday rotation," J. Appl. Phys. 77, 2902-2905 (1995).

(Continued)

*Primary Examiner* — Sung Pak
(74) *Attorney, Agent, or Firm* — Gates & Cooper LLP (57) ABSTRACT

By introducing magneto-optical garnets with high Faraday rotation and low optical loss in a ring resonator, a nonreciprocal phase shift is generated to split the resonance wavelengths of clockwise and counter-clockwise modes under magnetic field. There are three main applications based on this nonreciprocal effect, optical isolators, optical circulators, and tunable optical filters. The concept of the tunable filters and the design of optical isolators for TE and TM modes are described in the paper. With proper optical ring isolator configurations, optical circulators can be realized.

18 Claims, 11 Drawing Sheets

OTHER PUBLICATIONS

Yokoi et al., "Demonstration of an optical isolator with a semiconductor guiding layer that was obtained by use of a nonreciprocal phase shift," Appl. Opt. 39, 6158-6164 (2000).

Zaman et al., "Faraday rotation in an InP waveguide," Applied Physics Letters 90, 23514-23511-23514-23514-23513 (2007).

Zhou et al., "Wavelength-selective optical waveguide isolator based on nonreciprocal ring-coupled Mach-Zehnder interferometer," J. Lightwave Technol. 26, 3166-3172 (2008).

* cited by examiner

RING RESONATOR BASED OPTICAL ISOLATOR AND CIRCULATOR

STATEMENT REGARDING FEDERALLY SPONSORED RESEARCH OR DEVELOPMENT

This invention was made with Government support under Grant No. HR0011-09-C-0123, awarded by DARPA. The Government has certain rights in this invention.

BACKGROUND OF THE INVENTION

1. Field of the Invention

The present invention relates generally to semiconductor devices, and, more specifically, to a ring-resonator based optical isolator and circulator.

2. Description of the Related Art

As electronic devices increase in speed, and are more commonly used in optical systems, integration of electronic and optical semiconductor devices has become more common. Such circuits, often called photonic integrated circuits, have found uses in several consumer and commercial applications.

Proper integration of optical devices for inter-chip and intra-chip optical interconnections is important in the performance of the final integrated circuit. Some optical components, such as lasers, modulators, and photodetectors, can be monolithically integrated with electronic devices, however, other optical devices, such as optical isolators, are difficult to integrate with other electronic and optical devices.

Optical isolators are important devices in optical systems in that optical isolators minimize light reflections into transmitting lasers, and thus reduce instabilities and system noise in optical and electro-optical systems. Typically, optical isolators are integrated using a magneto-optical effect, and the mechanisms used to integrate optical isolators through magneto-optical effects are classified into three main categories: non-reciprocal Transverse Electric (TE)-Transverse Magnetic (TM) (TE-TM) mode conversion, non-reciprocal loss (NRL), and non-reciprocal phase shift (NRPS) devices.

Each type of device has associated performance and integration issues. A Nonreciprocal TE-TM mode converter in a waveguide creates an inherent phase mismatch between the TE and TM modes. In order to reach high conversion efficiency, phase matching is required between these two modes, however, zero birefringence is challenging to achieve in a waveguide.

A device employing the NRL technique has been demonstrated by combining a Semiconductor Optical Amplifier (SOA) and magneto-optical film, achieving a reasonable amount of isolation. However, the SOA requires continuous power consumption to compensate for the extra insertion loss due to the lossy magneto-optic material. Another approach to realize NRL is to guide backward light to a radiation mode, which increases optical loss and thus lowers performance.

NRPS devices has been embodied in a Mach-Zehnder Interferometer (MZI) for waveguide optical isolators, with a reasonable extinction ratio, however, these devices are typically sized on the order of millimeters, which makes monolithic integration difficult and expensive. NRPS combining microresonators for miniaturization of isolators has been proposed, which determines the size of the optical isolator by the size of the resonator, which can be on the order of microns, which remains difficult to integrate.

Problems associated with using discrete optical isolators incorporating such conversions are typically associated with performance of the system using such discrete devices. By integrating optical isolators with other photonic and electronic devices, performance can be improved and cost and size of the final circuitry is much smaller, thus creating additional applications for such integrated systems.

It can be seen, then, that there is a need in the art for optical isolators that are more readily integrated with other optical and electrical devices.

SUMMARY OF THE INVENTION

To minimize the limitations in the prior art, and to minimize other limitations that will become apparent upon reading and understanding the present specification, the present invention provides methods for making optical isolators and optical isolators. An optical isolator having semiconductor-device dimensions in accordance with one or more embodiments of the present invention comprises a resonator structure carrying forward light in a first direction and backward light in a second direction, and a magneto-optical film, coupled to the resonator structure, the magneto-optical film creating a shift between the forward light and the backward light travelling in the resonator structure, wherein the resonator structure and the magneto-optical film are sized to reside on a semiconductor chip.

Such an optical isolator further optionally comprises the resonator structure being a ring resonator structure, the magneto-optical film being coupled on a top of the ring resonator structure, a coil, coupled to the magneto-optical film, for controlling a magnetic field in the optical isolator, controlling a current in the coil filtering at least one of the forward light and the backward light by wavelength, a width and/or a height of the resonator structure being between 100 nanometers and 10 microns, the magneto-optical film being made from a material selected from a group consisting of yttrium iron garnet (YIG), bismuth iron garnet (BIG), bismuth-substituted gadolinium iron garnet ($BiGa_2Fe_5O_{12}$), and cerium-substituted yttrium iron garnet (Ce:YIG), the magneto-optical film being coupled on an inner diameter top of the resonator structure, and the resonator structure being a double ring resonator structure.

A method for making an optical isolator having semiconductor-device dimensions in accordance with one or more embodiments of the present invention comprises sizing a ring resonator structure for integration on a semiconductor chip, forming the semiconductor-chip sized ring resonator structure to carry forward light in a first direction and backward light in a second direction, and coupling a magneto-optical film to the ring resonator structure, wherein the magneto-optical film creates a shift between the forward light and the backward light travelling in the ring resonator structure.

Such a method further optionally comprises comprising coupling a coil to the magneto-optical film, controlling a current in the coil filtering at least one of the forward light and the backward light by wavelength, the magneto-optical film being made from a material selected from a group consisting of yttrium iron garnet (YIG), bismuth iron garnet (BIG), bismuth-substituted gadolinium iron garnet ($BiGa_2Fe_5O_{12}$), and cerium-substituted yttrium iron garnet (Ce:YIG), and the semiconductor-device dimensions being between 100 nanometers and 10 microns.

A semiconductor optical isolator in accordance with one or more embodiments of the present invention comprises an input semiconductor waveguide on a semiconductor chip, an output semiconductor waveguide on the semiconductor chip, a ring resonator on the semiconductor chip, coupled between the input waveguide and the output waveguide, and a magneto-optical film, coupled to the ring resonator, wherein the magneto-optical film creates a shift between a forward light and a backward light travelling in the resonator structure.

Such an optical isolator further optionally comprises the magneto-optical film being made from a material selected from a group consisting of yttrium iron garnet (YIG), bismuth iron garnet (BIG), bismuth-substituted gadolinium iron garnet ($BiGa_2Fe_5O_{12}$), and cerium-substituted yttrium iron garnet (Ce:YIG), and at least one of a height and a width of the ring resonator is between 100 nanometers and 10 microns.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Photonic integrated circuits have attracted attention for application to inter-chip and intra-chip optical interconnects. Most of the optical components, such as lasers, modulators, and photodetectors, can be monolithically integrated. However, optical isolators, which avoid the unwanted reflected light back to the laser and thus reduce instabilities and relative intensity noise, are still difficult for integration with other optoelectronic devices.

Integrated optical resonators, typically made at least partially of magneto-optical material. Such materials are typically transparent to the wavelength(s) of interest. Several compounds, such as yttrium iron garnet (YIG), bismuth iron garnet (BIG), bismuth-substituted gadolinium iron garnet ($BiGa_2Fe_5O_{12}$), cerium-substituted yttrium iron garnet (Ce:YIG) have been developed, and such materials have low (less than 0.03 $cm^{-1}$) optical absorption in the range from 1.5 microns to 5 microns, while at 1.3 microns, the absorption coefficient of Ce:YIG is approximately 1 $cm^{-1}$.

Although all of the materials listed above, as well as other magneto-optical materials, are useful within the scope of the present invention, Ce:YIG is a preferred candidate for a magneto-optic material for use in the present invention, because Ce:YIG has a high Faraday rotation, low optical loss, and, for integration purposes, is compatible with silicon and silica. For example, and not by way of limitation, a waveguide made of epitaxially-sputtered Ce:YIG exhibited 5.8 dB/cm and 9.7 dB/cm of optical loss for TM mode and TE mode, respectively.

The present invention provides approaches and devices that integrate optical isolators with other optical devices, e.g., lasers, modulators, etc., and electronic devices, by incorporating a high Faraday rotation and low optical loss magneto-optical material into a microring resonator structure, such that the optical isolator is sized to be integrated on a semiconductor chip. Such a compact isolator can be integrated with semiconductor lasers and modulators and electronic devices.

Integrated Optical Isolator Structures

Figure 1:
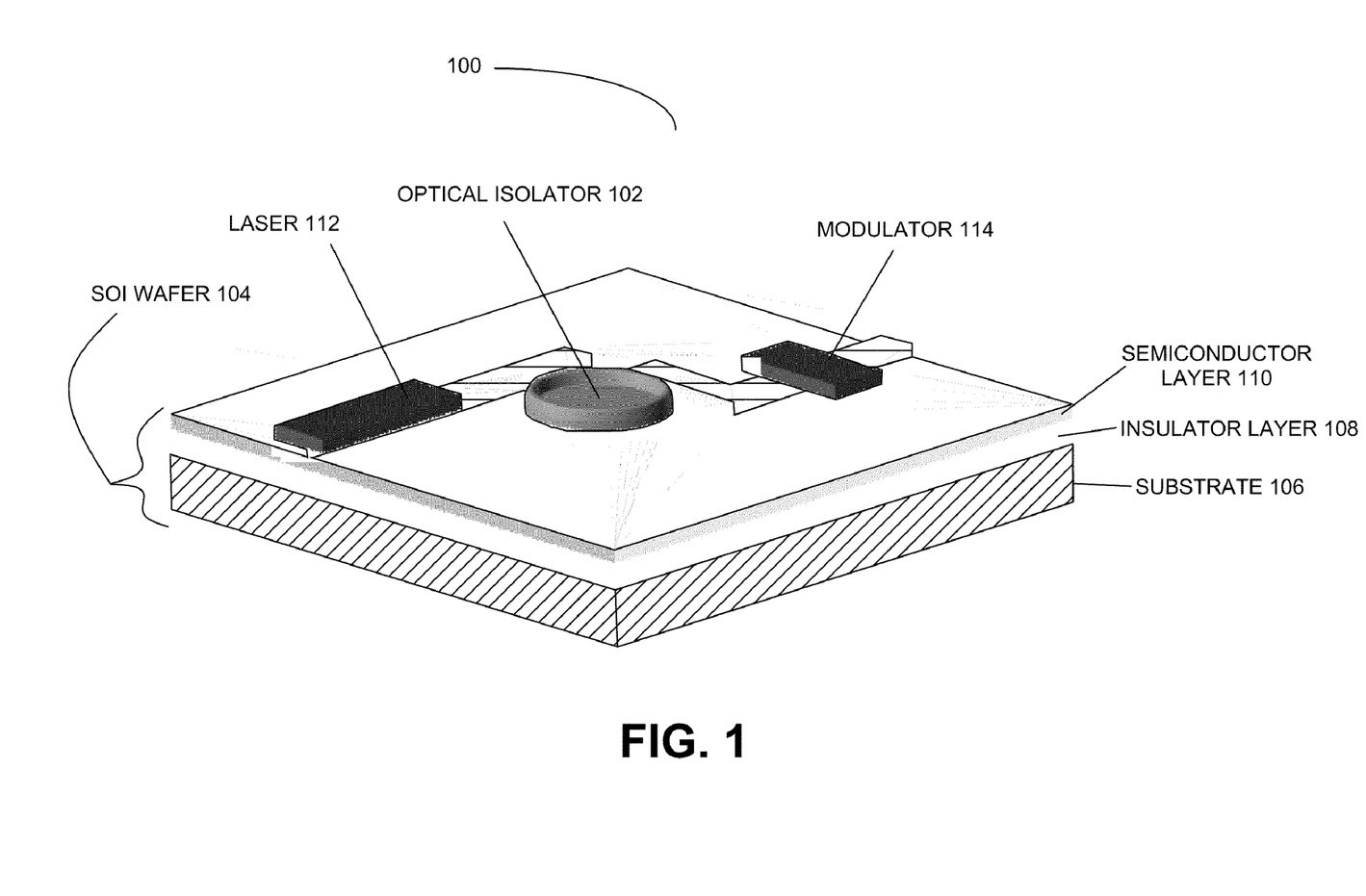
FIG. 1 illustrates a schematic diagram of an integrated semiconductor laser, isolator, and modulator on an SOI wafer in accordance with one or more embodiments of the present invention.

FIG. 1 illustrates a schematic diagram of an integrated semiconductor laser, isolator, and modulator on an SOI wafer in accordance with one or more embodiments of the present invention.

Structure 100 is shown, with optical isolator 102 resident on a Semiconductor-On-Insulator (SOI) wafer 104. SOI wafer 104 typically comprises a substrate 106, an insulator layer 108, and a semiconductor layer 110, but can comprise additional layers as desired. Typically, substrate 106 is silicon, but can be other materials, such as silicon carbide, without departing from the scope of the present invention. Further, insulator layer 110 is typically silicon oxide, but can be other insulator materials, and semiconductor layer 110 is typically silicon, but can be other semiconductor materials, including compound semiconductors, and semiconductor layer 110 can be doped, undoped, or selectively or gradient doped, without departing from the scope of the present invention.

Optical isolator 102 is co-resident with at least one other device on SOI wafer 104, and two such devices, laser 112 and modulator 114, are shown. Additional devices, including electronic devices which may be resident in semiconductor layer 110, grown on semiconductor layer 110, or bonded to semiconductor layer 110, are also possible within the scope of the present invention, which would electrically, optically, or otherwise integrates or couple the optical isolator 102 with such devices.

Nonreciprocal Ring Resonator with Magnetic Garnets

Figure 2A:
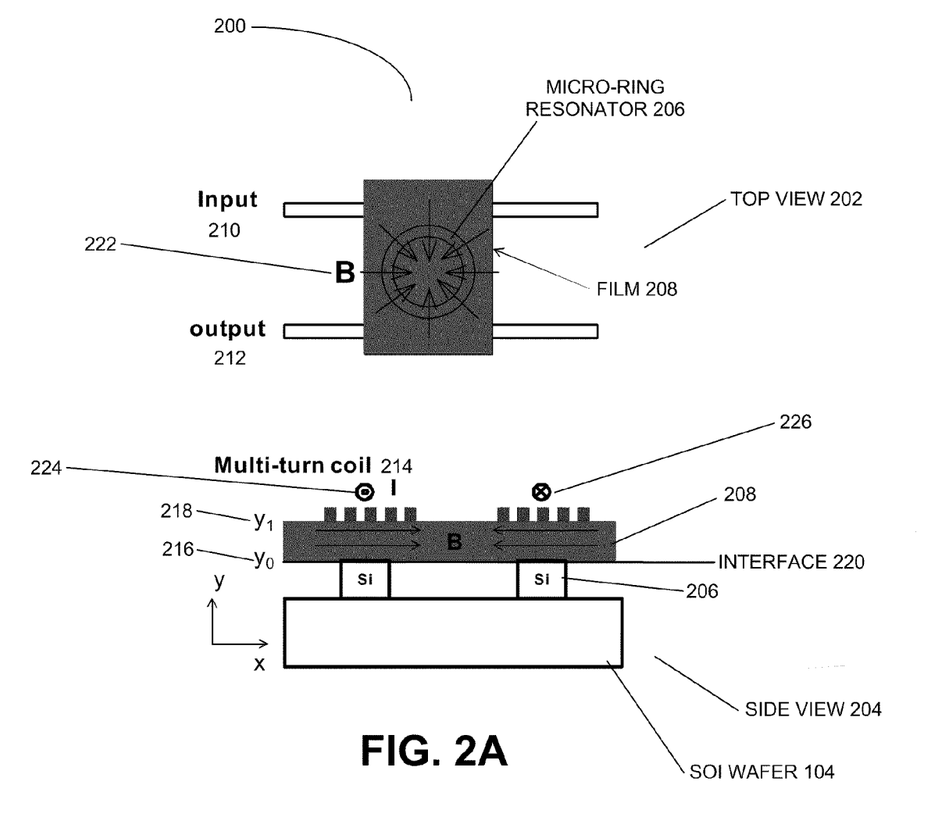
FIGS. 2A and 2B illustrate top and side views of configurations of the ring optical isolator of the present invention for the TM and TE modes in accordance with one or more embodiments of the present invention.
Figure 2B:
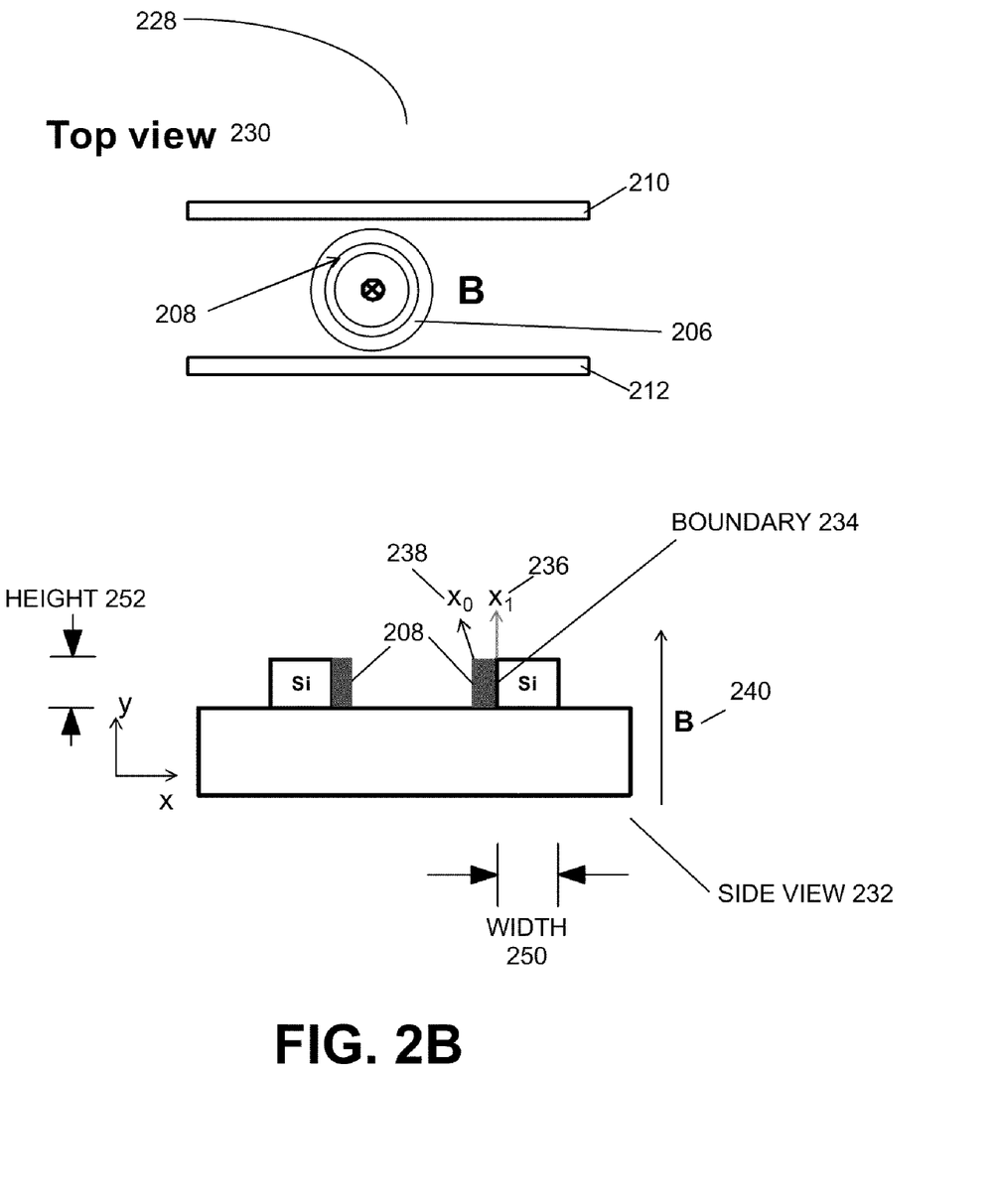

FIGS. 2A and 2B illustrate top and side views of configurations of the ring optical isolator of the present invention for the TM and TE modes in accordance with one or more embodiments of the present invention.

FIG. 2A illustrates a TM mode optical isolator 200 in a top view 202 and a side cutaway view 204. Resonator 206 (also called a ring resonator or micro-ring resonator) is shown, with film 208 (also called a magneto-optical film, typically Ce:YIG but can be other materials) coupled to a top of the resonator 206. Input waveguide 210 and output waveguide 212 couple light into and out of the resonator 206, and optional multi-turn coil 214, when desired, is coupled either within or to film 208.

Optical isolator 200 is a ring resonator, and thus has a non-reciprocal phase shift (NRPS), where the degeneracy of the clockwise mode and the counterclockwise mode no longer exists. Therefore, the resonance wavelengths for the forward light (the light travelling clockwise in the resonator 206) and the backward light (the light travelling counter-clockwise in the resonator 206) are different, which results in isolation between the forward light and the backward light. The isolation (e.g., the phase and/or frequency shift between forward and backward light) is determined by the Faraday rotation of the film 208 and the quality factor (Q) of the ring resonator 206.

To achieve this nonreciprocal quality of resonator 206 in the TM mode, the boundary between the magneto-optic layer (film 208) and the resonator 206 should be horizontal (along the x-axis), and thus film 208 is typically attached on the top of the resonator 206. Thus, film 208 is coupled "on top of" or "over" resonator 206. Typically, film 208 is coupled to resonator 206 through bonding or deposition, but can also be deposited in other ways without departing from the scope of the present invention.

For resonator 206, where the case of the magneto-optic film 208 is coupled on top of resonator 206 as shown in FIG. 2A, only TM-like light will experience NRPS. Using perturbation theory, the NRPS is found to be $$\Delta\beta = j\omega\varepsilon_0 \int \varepsilon_{yz} E_y E_z dx dy = \frac{\int\int |H_x|^2 \frac{\partial}{\partial y}\left(\frac{\varepsilon_{yz}}{n^2}\right) dx dy}{\int\int |H_x|^2 dx dy} \propto |H_x(y_0)|^2 - |H_x(y_1)|^2$$

where $E_y$ and $E_z$ are components of the electrical field in the y and z directions, $H_x$ and $H_z$ are components of the magnetic field in the x and z directions, $y_0$ and $y_1$ are the top and bottom boundary of the magneto-optic film 208 (shown as reference numerals 216 and 218, respectively), and $\varepsilon_{yz}$ represents the off-diagonal terms of the dielectric tensor of the film 208, which is a function of the Faraday coefficient of the material. The thickness of film 208 is the difference between $y_0$ 216 and $y_1$ 218, and the interface 220 between film 208 and resonator 206 is essentially at $y_0$ 216.

In order to maximize the NRPS in resonator 206, the peak of the field intensity profile should be positioned close to or at the interface 220 of the magneto-optic film 208 and the resonator 206. Maximization or other field intensities are achieved through resonator 206 design parameters.

In resonator 206, the external magnetic field should be in the radial direction. However, it is difficult to make a permanent magnet with a magnetic field in a uni-radial direction and then align this field to the resonator 206 ring structure. Thus, an optional addition to structure 200 employs multi-turn coil 214, which is shown attached to film 208, to generate the magnetic field B 222 (pointing inward toward the center of the ring resonator 206) shown in top view 202 of FIG. 2A. By controlling the direction of the current in coil 214, either clockwise or counterclockwise (shown as counter-clockwise in side view 204, with the head of the arrow pointing out at point 224 and the tail of the current arrow pointing in at point 226), the direction of the generated magnetic field can be selectively directed toward or away from the center of the ring resonator 206. Such an approach eliminates external magnets from structure 200 and enables the integrity of the optical isolator, at a small expense of additional power consumption. Further, by adjusting the current in coil 214, structure 200 becomes a tunable filter as well as an optical isolator.

FIG. 2B illustrates a TE mode isolator 228 in top view 230 and side view 232. For TE polarized light, the magneto-optic layer boundary 234, at film 204 edge $x_0$ 236, should be in a vertical direction (normal to the plane of the resonator 206 ring structure), and thus the film 204, with thickness shown between $x_0$ 236 and $x_1$ 238, is attached on the sidewall of the resonator 206 ring as shown.

For this case, where TE light is employed and the magneto-optic film 204 is attached on the sidewall of the resonator 204 ring, the external magnetic field direction B 240 is vertical, and only TE-like light will experience the nonreciprocal phase shift, which can be written as $$\Delta\beta = j\omega\varepsilon_0 \int \varepsilon_{xz} E_x E_z dx dy = \frac{\int\int |H_y|^2 \frac{\partial}{\partial y}\left(\frac{\varepsilon_{xz}}{n^2}\right) dx dy}{\int\int |H_y|^2 dx dy} \propto |H_y(x_0)|^2 - |H_x(x_1)|^2$$

Similar to the case of the TM mode optical isolator 200, the magnetic field intensity in the interface of the magnet-optic film 204 and the silicon waveguide should be as large as possible to increase the NRPS and thus the performance of the isolator 228. Isolator 228 can use an external permanent magnet (not shown) to provide additional magnetic field strength if needed.

Resonator Design

The ring isolator 200/228 can be realized in many platforms where optical waveguides and resonators 206 can be integrated. Although described with respect to SOI wafer 104 platforms herein, because of certain advantages of silicon photonics, other materials or platforms may be used without departing from the scope of the present invention.

Design of isolators 200/228, and, as described hereinbelow, a TE mode isolator 228, uses design metrics in order to produce figures-of-merit to determine the suitability of a given isolator 200/228 for a desired application.

Figure 3A:
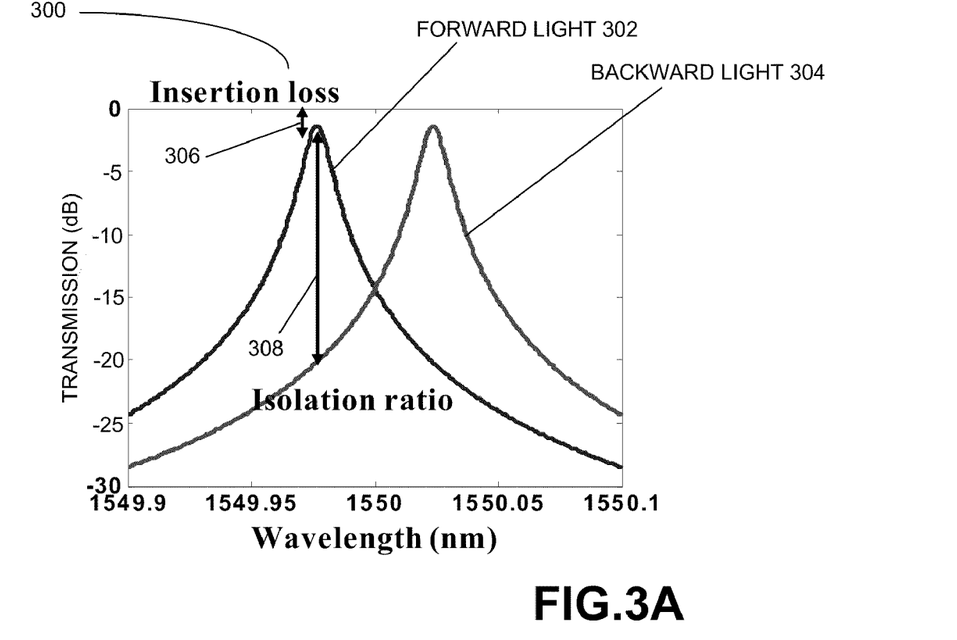
FIG. 3A illustrates the design metrics used to evaluate resonators in accordance with one or more embodiments of the present invention.

FIG. 3A illustrates the design metrics used to evaluate resonators. Typically, the metrics used to generate the figures-of-merit are the isolation ratio and the insertion loss of the isolator 200/228, which provide evaluation points for isolators 200/228. Graph 300 illustrates a typical isolator 200/228, with forward light 302 and backward light 304 travelling in isolator 200/228, with insertion loss 306 and isolation ratio 308 shown.

Initially, design of the isolator 200/228 determines the dimensions of ring resonator 206. As shown in FIG. 2B, with a TE-mode isolator 228, material for the film 208 is chosen, which is typically Ce:YIG and a thickness for the film 208 is chosen, which was chosen for the following example as 200 nm of film 208 thickness. The refractive index and Faraday coefficient of Ce:YIG are 2.22 and 4500°/cm, respectively. Film 208 is then attached onto the sidewall of resonator 206.

Table 1 summarizes the resonance wavelength splitting between forward and backward light for different widths 250 of the resonator 206 ring while the height 252 was fixed at 700 nm. A width of 300 nm is chosen as typical for the following example isolator 228, as such width provides reasonable NRPS and does not impose an excessive burden on fabrication techniques used to construct isolator 228. Other widths 250 and heights 252 are possible within the scope of the present invention. Width 250 and height 252 are dimensioned or sized such that the resonator 206 can reside on a semiconductor chip, e.g., width 250 and height 252 are typically in the range of 10 nanometers to 100 microns, preferably between 100 nanometers and 10 microns, and more preferably between 100 nanometers and 1 micron.

TABLE 1

Resonance wavelength splitting of the ring resonator and the confinement factor of the magneto-optic film. The height of the ring is 700 nm.

| Width of the ring | Resonance wavelength splitting | Confinement factor of MO |
|---|---|---|
| 200 nm | 173 pm | 65.42% |
| 300 nm | 78 pm | 29.34% |
| 400 nm | 30.2 pm | 12.35% |
| 500 nm | 14.7 pm | 6.21% |

Figure 3B:
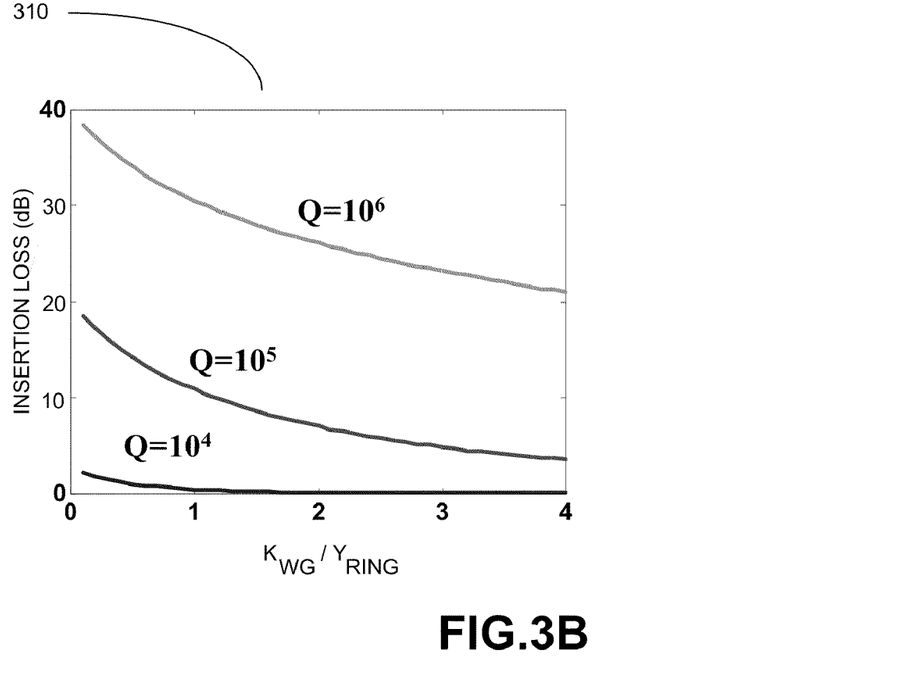
FIGS. 3B and 3C illustrate the influence of coupling between waveguides and the resonator with respect to isolation ratio and insertion loss in accordance with one or more embodiments of the present invention.
Figure 3C:
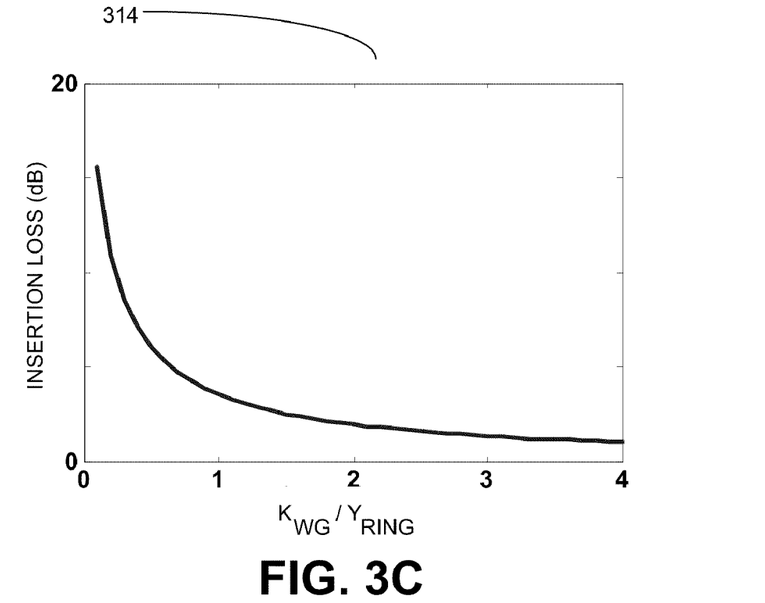

FIGS. 3B and 3C illustrate the influence of coupling between waveguides 210/212 and the resonator 206 with respect to isolation ratio 308 and insertion loss 306. Coupling parameters between resonator 206 and waveguides 210 and 212 are then determined. The power coupling ratio between the waveguides 210/212 and the resonator 206 is represented by $\varkappa_{WG}$ shown on graph 310 in FIG. 3B for various values of Q, while the round-trip loss in the resonator 206 is represented by $\gamma_{ring}$ and are shown in FIG. 3C on graph 314. The resonator 206 loss can be dominated by scattering loss or material absorption, depending on fabrication techniques used in fabricating resonator 206. The isolation ratio 308 decreases with an increase in coupling because the transmission spectrum becomes broader. However, the insertion loss 306 can benefit from the strong coupling because a larger portion of power is coupled to the output waveguide 212 instead of lost in the resonator 206.

Figure 3D:
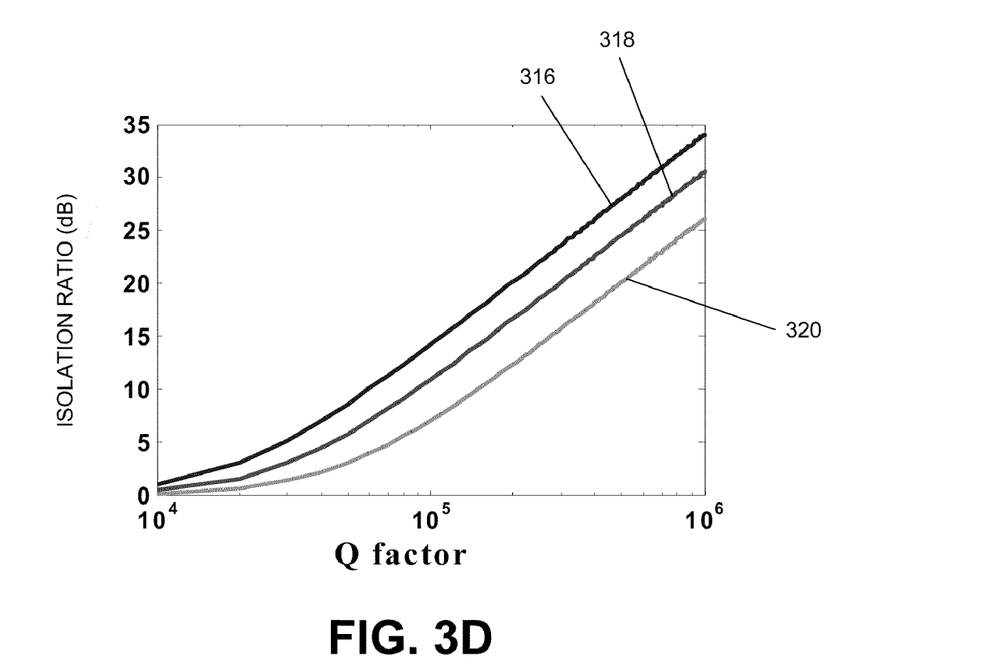
FIG. 3D illustrates the dependency of isolation ratio on the quality factor of the resonator in accordance with one or more embodiments of the present invention.

FIG. 3D illustrates the dependency of isolation ratio 308 on the quality factor of the resonator 206.

Resonators with higher Quality (Q) factors (where Q is the resonant frequency divided by the bandwidth) have narrower transmission spectra, and thus higher isolation ratios 308. Although resonators 206 with lower Q factors are lossier, the insertion loss 306 can be compensated or overcome by stronger coupling. Therefore, the insertion loss versus coupling-loss ratio ($\varkappa_{WG}/\gamma_{ring}$) is independent of Q factors as shown in FIG. 3C. However, the power coupling ratio cannot exceed one since there is no gain in a passive device. Graph 316 illustrates the loss versus coupling-loss ratio where $\varkappa_{WG}=0.5\gamma_{ring}$, graph 318 illustrates the loss versus coupling-loss ratio where $\varkappa_{WG}=\gamma_{ring}$, and graph 320 illustrates the loss versus coupling-loss ratio where $\varkappa_{WG}=2\gamma_{ring}$.

Series-Cascaded Double Ring Isolator

In order to further increase the isolation ratio and bandwidth, especially for ring resonators 206 with lower Q factors, higher order rings can be fabricated within the scope of the present invention.

Figure 4:
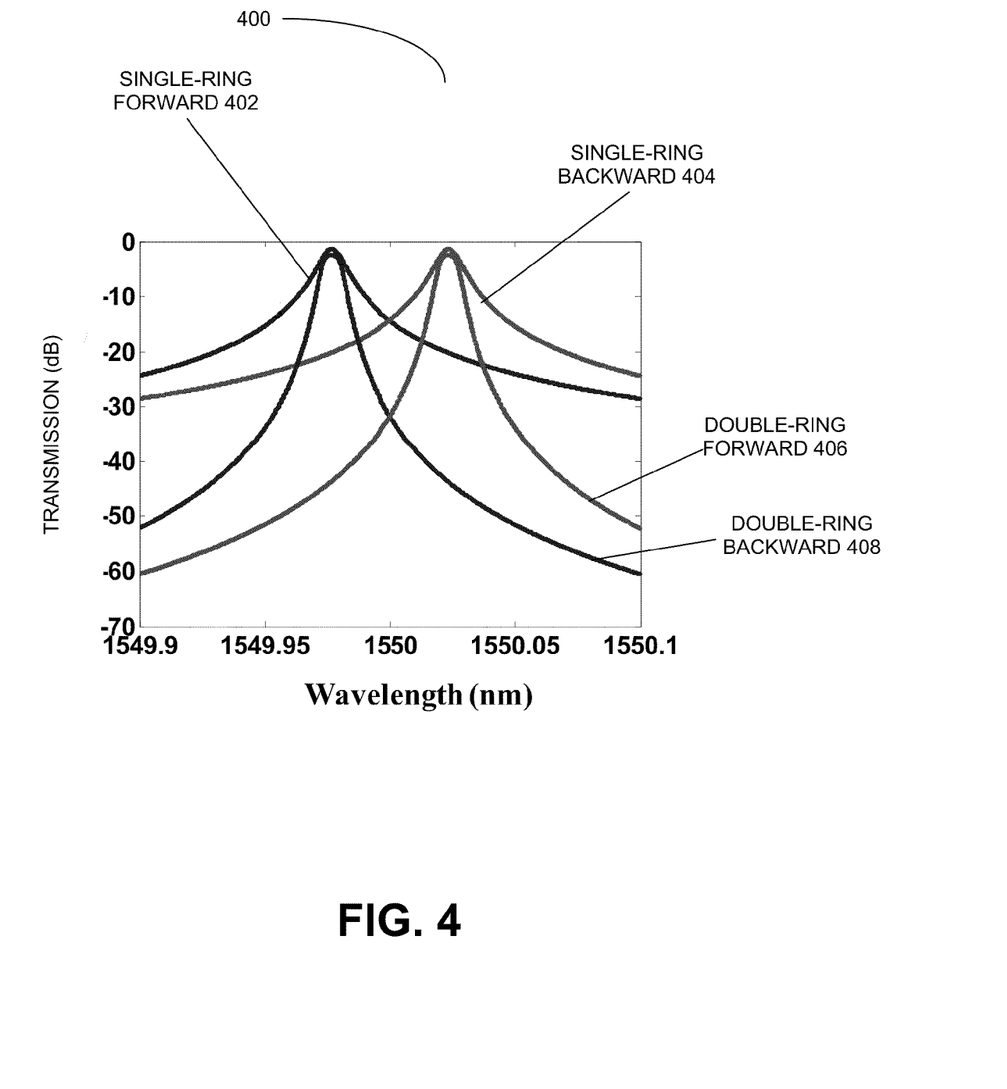
FIG. 4 illustrates a transmission spectra of a single-ring resonator of the present invention and a series-cascaded double-ring resonator of the present invention.

FIG. 4 illustrates a transmission spectra of a single-ring resonator of the present invention and a series-cascaded double-ring resonator of the present invention.

FIG. 4, in graph 400, shows the comparison of transmission spectra between a single-ring resonator and a series-cascaded double-ring resonator having the same Q factor. The transmission of forward light 402 and backward light 404 in the single-ring resonator, and the transmission of forward light 406 and backward light 408 in the double-ring isolator, are shown. The double-ring isolator exhibits larger isolation ratio and bandwidth at a small expense of insertion loss, which can be compensated by stronger coupling between the waveguides and the resonator 406 ring.

Similar to the design of a single-ring isolator, the coupling is also an important factor that affects the isolation ratio and insertion loss for a double-ring isolator. In addition to the waveguide-ring power coupling ratio ($\varkappa_{WG}$), the ring-ring power coupling ratio ($\varkappa_{ring}$) also affects the performance of a double-ring isolator in accordance with the present invention.

Figure 5A:
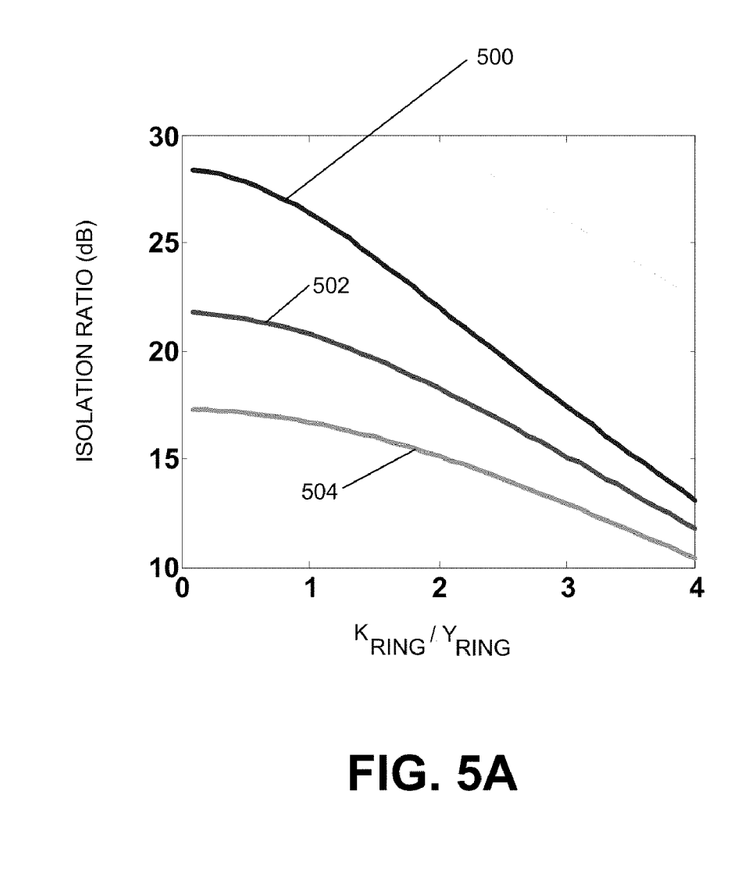
FIGS. 5A-5B illustrate design plots for double-ring isolators in accordance with one or more embodiments of the present invention.
Figure 5B:
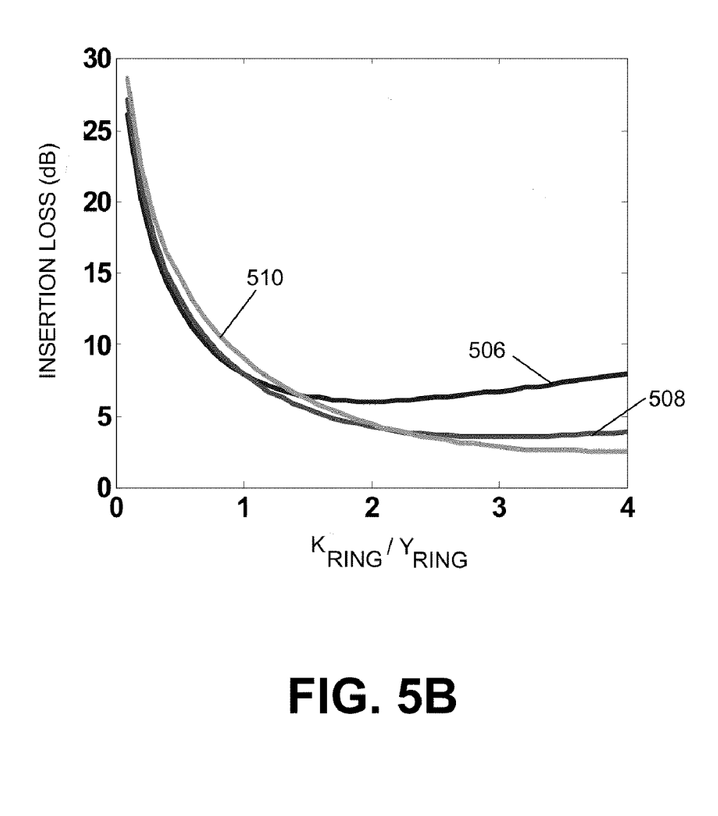

FIGS. 5A-5B illustrate the dependence of isolation ratio and insertion for double-ring isolators in accordance with one or more embodiments of the present invention.

Graphs 500-510 illustrate various ratios of $\varkappa_{WG}$ and $\gamma_{ring}$ for $\varkappa_{ring}/\gamma_{ring}$ where the Q factor of both ring resonators is given as equal to $10^5$. Graph 500 illustrates the condition where $\varkappa_{WG}=\gamma_{ring}$, graph 502 illustrates the condition where $\varkappa_{WG}=2\gamma_{ring}$, graph 504 illustrates the condition where $\varkappa_{WG}=3\gamma_{ring}$, and FIG. 5A illustrates the effect of the change of these parameters on the isolation ratio 308. Graph 506 illustrates the condition where $\varkappa_{WG}=\gamma_{ring}$, graph 508 illustrates the condition where $\varkappa_{WG}=2\gamma_{ring}$, graph 510 illustrates the condition where $\varkappa_{WG}=3\gamma_{ring}$, and FIG. 5B illustrates the effect of the change of these parameters on the insertion loss 306.

Strong coupling (both $\varkappa_{WG}$ and $\gamma_{ring}$) typically results in a smaller isolation ratio 308. However, there is an optimal ring-ring coupling value to minimize the insertion loss 306, because the coupling between the rings splits each transmission peak for forward and backward light. By properly choosing the coupling, the insertion loss can be minimized with larger isolation bandwidth.

Influence of Q Factor on Isolation Ratio

Figure 6:
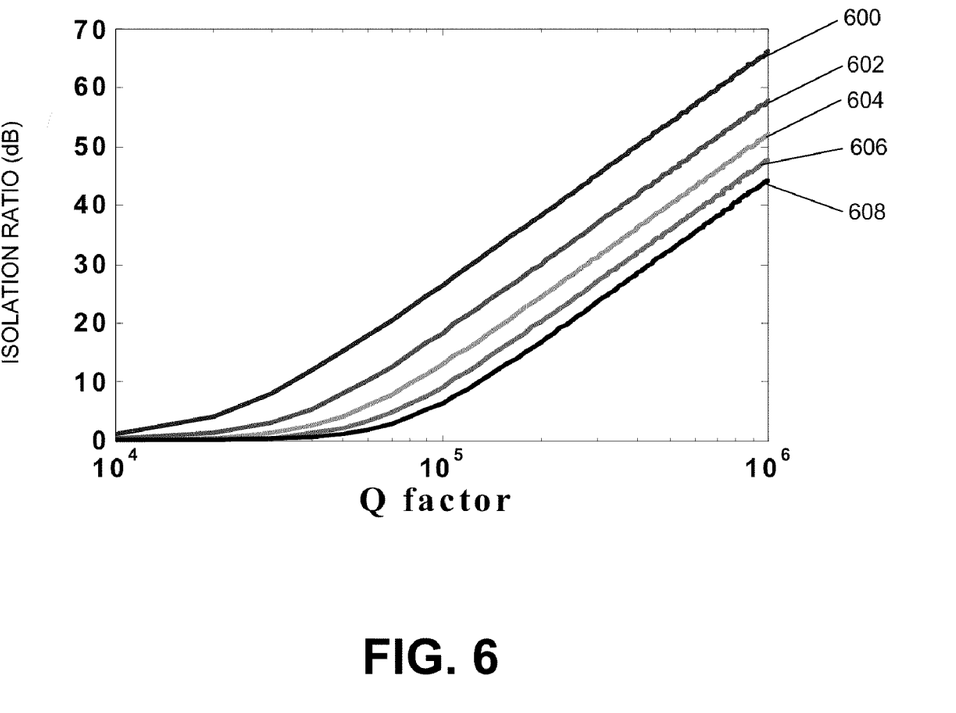
FIG. 6 illustrates the influence of Q factor on isolation ratio for a double-ring isolator in accordance with one or more embodiments of the present invention.

FIG. 6 illustrates the influence of Q factor on isolation ratio for a double-ring isolator in accordance with one or more embodiments of the present invention.

Similar to the single-ring isolator 200/228, the isolation ratio increases with the Q factor. The waveguide-ring coupling and the ring-ring coupling ($\varkappa_{WG}=\varkappa_{ring}=\varkappa$) is assumed as equal for the calculation, and graphs 600-608 illustrate the dependence of the ratio of $\varkappa_{WG}$ to $\gamma_{ring}$ on isolation ratio 308. Graph 600 illustrates the design where $\varkappa_{WG}=\gamma_{ring}$, graph 602 illustrates the design where $\varkappa_{WG}=2\gamma_{ring}$, graph 604 illustrates the design where $\varkappa_{WG}=3\gamma_{ring}$, graph 606 illustrates the design where $\varkappa_{WG}=4\gamma_{ring}$, and graph 608 illustrates the design where $\varkappa_{WG}=5\gamma_{ring}$.

From these design graphs 600-608, isolators in accordance with the present invention, with specific isolation ratios and insertion losses, can be obtained by choosing proper waveguide-ring coupling, ring-ring coupling, and the Q factor.

Figure 7A:
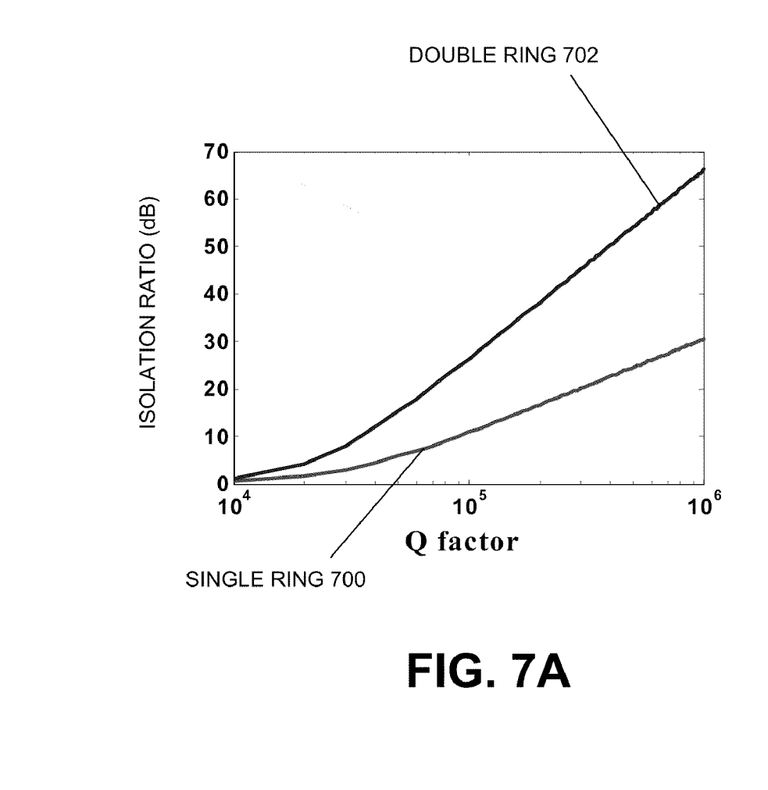
FIGS. 7A-7B illustrate comparisons of a single-ring isolator of the present invention and a double-ring isolator of the present invention.
Figure 7B:
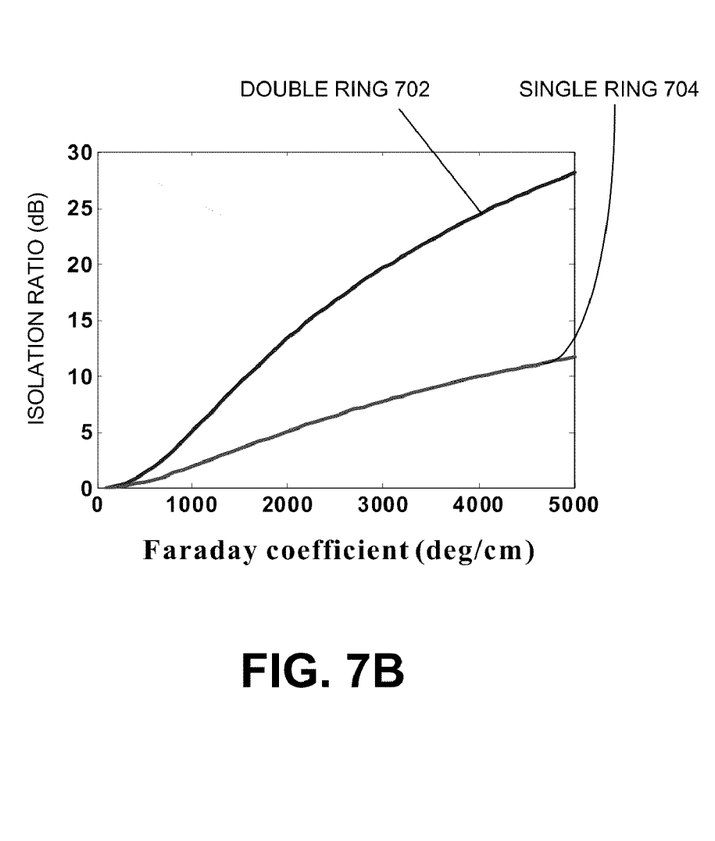

FIGS. 7A-7B illustrate comparisons of a single-ring isolator of the present invention and a double-ring isolator of the present invention.

Graphs 700-706 are shown, which indicate that the isolation ratio of the double-ring isolator has a stronger dependence on Q factor than the single-ring isolator, and thus it increases faster in the double-ring isolator than in the single-ring isolator as shown by graphs 700 and 702 in FIG. 7A.

Graphs 704 and 706 show the relationship between the isolation ratio and Faraday coefficient of the magneto-optic material used in the isolator. Two common materials used for isolators are Ce:YIG and BIG, and their Faraday coefficient are approximately 4500°/cm and 3000°/cm, respectively, in the 1550 nm spectral regime. Graphs 704 and 706 suggest that advantages of a double-ring isolator structure become more prevalent when larger Q factors and larger Faraday coefficient materials are used in the design and construction of the isolators of the present invention.

Confinement Factor of Magneto-Optic Film

Although the above discussion obtains NRPS of the isolator of the present invention first through geometry and dimensioning of the ring isolator, and then using the calculated NRPS to calculate the isolation ratio 308 and insertion loss 306, there is another relationship between the NRPS and Q factor, which are both dependent on the confinement factor of the magneto-optic film 208.

According to the equations provided herein, the maximum resonance wavelength splitting occurs when the peak of the optical profile is positioned at the interface of the resonator 206 and the magneto-optic film 208. However, because the refractive index of the material used in the resonator, which is typically silicon (where n=3.45) is much larger than that of Ce:YIG (n=2.22), the peak of the optical profile when silicon and Ce:YIG are used in device 200 would be located inside the resonator 206 silicon core. Thus, the peak of the optical profile can be positioned close to or at the interface only when the width of the silicon core of the resonator 206 is very small. It is possible to use another material with a lower refractive index, e.g., silicon nitride which has n=1.98 at 1550 nm, which may change the dimensions required for resonator 206. The optimal dimensioning of lower-index material waveguides will be larger than the dimensions of higher-index material waveguides, and thus the optical mode of the waveguide will also be larger. Thus, the peak intensity will be lower in the lower-index material waveguides, and since NPRS is proportional to field intensity differences between the two interfaes of the film 208, the NPRS of lower-index material waveguides used in the present invention will be smaller as well, but are still useable in the present invention.

When magneto-optic film 208 is used a waveguide cladding, the NRPS is approximately linearly proportional to the optical confinement factor in the film 208. Larger confinement factors will allow for more resonance wavelength splitting. However, sidewall roughness of the resonator 206 ring, and film 208 absorption, will create additional waveguide scattering loss, which will degrade the Q factor of the ring resonator 206. Such losses will tend to cancel any benefits obtained from larger resonance wavelength splitting, and thus the confinement factor has relatively little influence on the isolation ratio 308.

Figure 8:
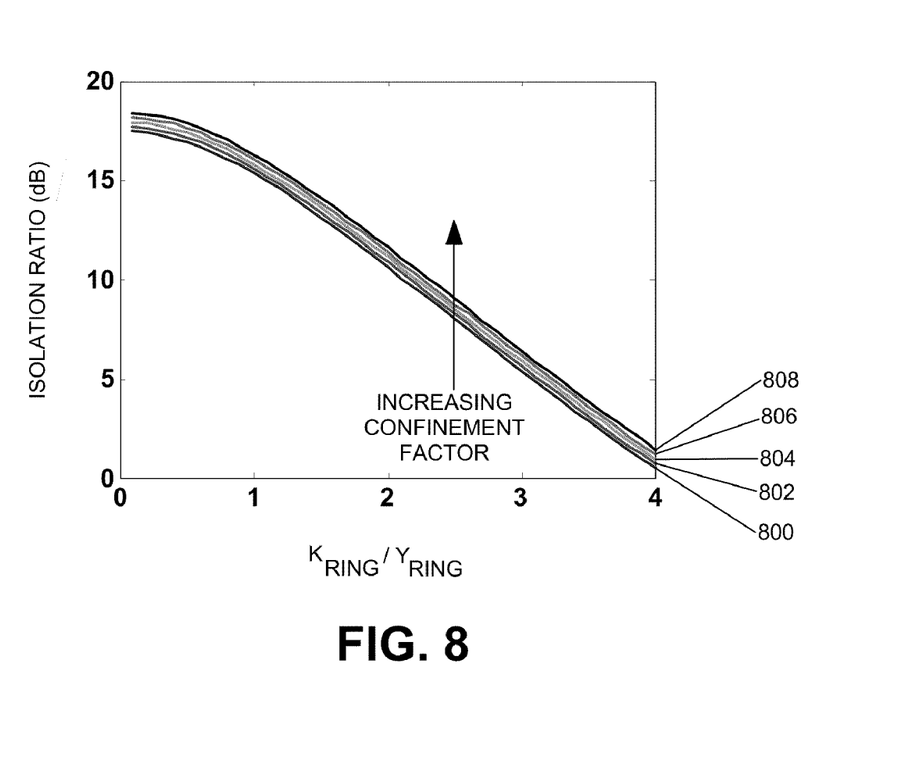
FIG. 8 illustrates changes in isolation ratio with the confinement factor for the double-ring isolator of 50-μm radius in accordance with one or more embodiments of the present invention.

FIG. 8 shows changes in isolation ratio with the confinement factor for the double-ring isolator of 50-μm radius in accordance with one or more embodiments of the present invention.

Graphs 800-808 show changes in percentages of optical confinement factor in the film 208 from graph 800 at 10%, graph 802 at 20%, graph 804 at 30%, graph 806 at 40%, and graph 808 at 50%, showing that the isolation ratio for each is relatively constant regardless of the percentage of the confinement factor.

Optical Circulator

Figure 9:
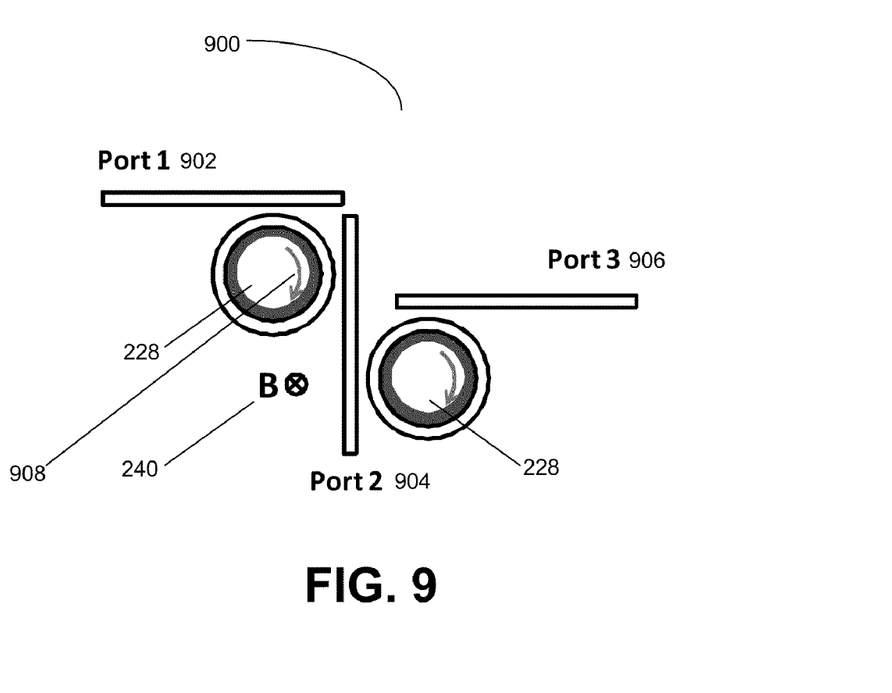
FIG. 9 illustrates an optical circulator in accordance with one or more embodiments of the present invention.

FIG. 9 illustrates an optical circulator in accordance with one or more embodiments of the present invention.

Circulator 900 comprises a plurality of isolators 200/228, shown as isolator 228 in FIG. 9. Port 1 902, port 2 904, and port 3 906 are also shown, where light propagation is allowed from port 1 902 to port 2 904, and from port 2 904 to port 3 906. Typically, other propagation directions are prohibited in such a circulator 900, however, other circulator designs can allow other propagation paths. Direction 908 is shown to show the forward direction of light through the isolators 228, and magnetic field B 240 is shown, with the field lines pointing into the page as indicated by the tail of the arrow indicator.

One advantage of this configuration compared to circulators with cascaded isolators is to eliminate the need for a coupler, typically a 3dB coupler, in port 2 904, thus, the present invention's circulator 900 eliminates at least 3dB of loss in any system using the circulator 900 of the present invention. Each ring isolator 200 can also be replaced by a double-ring isolator as discussed herein if increased extinction ratios are desired in an application of circulator 900.

Tunable Optical Filter

The present invention, as shown herein in at least FIGS. 2A and 2B, can also be used as a tunable optical filter by controlling the external field, typically with multi-turn coil 214, but also with external magnets or electromagnets as desired. Typically, for an optical isolator, the magnetization of magneto-optic film 208 is in the saturation region to reach maximum NRPS. However, for a tunable optical filter, the magnetization of the film 208 is in the linear region, i.e., the magnetization of film 208 is proportional to the external magnetic field. Therefore, the NRPS is tunable by adjusting the current in the coil 214.

Bidirectional Wavelength-Selective Isolator

Another application of the isolator 200/228 of the present invention is a bidirectional wavelength-selective isolator for two interleaved sets of optical wavelengths, where isolator 200/228 adjusts the splitting of the resonance wavelength to be approximately half of the free spectral range. This is useful in wavelength-interleaved bidirectional transmission, as such a configuration minimizes back reflection for both Wavelength Division Multiplexed (WDM) channel sets in opposite directions, and therefore reduce the number of the fiber links required in an optical transmission system.

Process Chart

Figure 10:
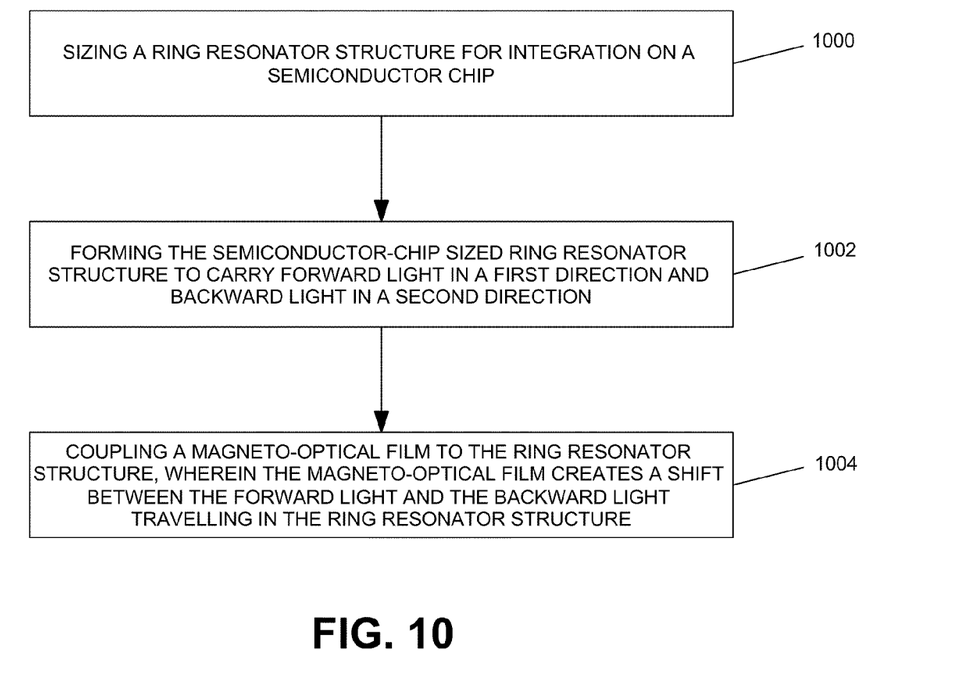
FIG. 10 illustrates a process chart in accordance with the present invention.

FIG. 10 illustrates a process chart in accordance with the present invention.

Box 1000 illustrates sizing a ring resonator structure for integration on a semiconductor chip.

Box 1002 illustrates forming the semiconductor-chip sized ring resonator structure to carry forward light in a first direction and backward light in a second direction.

Box 1004 illustrates coupling a magneto-optical film to the ring resonator structure, wherein the magneto-optical film creates a shift between the forward light and the backward light travelling in the ring resonator structure.

References

The following references are incorporated herein by reference:

1. T. R. Zaman, X. Guo, and R. J. Ram, "Faraday rotation in an InP waveguide," Applied Physics Letters 90, 23514-23511-23514-23514-23513 (2007).
2. H. Shimizu, and Y. Nakano, "Fabrication and characterization of an InGaAsP/InP active waveguide optical isolator with 14.7 dB/mm TE mode nonreciprocal attenuation," J. Lightwave Technol. 24, 38-43 (2006).
3. Y. Shoji, H. Yokoi, and T. Mizumoto, "Enhancement of magneto optic effect in optical isolator with GaInAsP guiding layer by selective oxidation of AlInAs," Jpn. J. Appl. Phys. 1, Regul. Pap. Short Notes Rev. Pap. 43, 590-593 (2004).

4. J. Fujita, M. Levy, J. R. M. Osgood, L. Wilkens, and H. Dotsch, "Waveguide optical isolator based on Mach—Zehnder interferometer," Applied Physics Letters 76, 2158-2160 (2000).
5. N. Kono, K. Kakihara, K. Saitoh, and M. Koshiba, "Nonreciprocal microresonators for the miniaturization of optical waveguide isolators," Opt. Express 15, 7737-7751 (2007).
6. S. Sang-Yeob, Q. Xiaoyuan, and B. J. H. Stadler, "Integrating yttrium iron garnet onto nongarnet substrates with faster deposition rates and high reliability," Applied Physics Letters 87, 121111-121111-121111-121111-121113 (2005).
7. T. Shintaku, A. Tate, and S. Mino, "Ce-substituted yttrium iron garnet films prepared on $Gd_3Sc_2Ga_3O_{12}$ garnet substrates by sputter epitaxy," Applied Physics Letters 71, 1640-1642 (1997).
8. M. Wallenhorst, M. Niemoller, H. Dotsch, P. Hertel, R. Gerhardt, and B. Gather, "Enhancement of the nonreciprocal magneto-optic effect of TM modes using iron garnet double layers with opposite Faraday rotation," J. Appl. Phys. 77, 2902-2905 (1995).
9. H. Yokoi, T. Mizumoto, N. Shinjo, N. Futakuchi, and Y. Nakano, "Demonstration of an optical isolator with a semiconductor guiding layer that was obtained by use of a nonreciprocal phase shift," Appl. Opt. 39, 6158-6164 (2000).
10. S. Mino, M. Matsuoka, A. Tate, A. Shibukawa, and K. Ono, "Completely Bi-substituted iron garnet (BIG) films prepared by electron cyclotron resonance (ECR) sputtering," Jpn. J. Appl. Phys. 1, Regul. Pap. Short Notes 31, 1786-1792 (1992).
11. Z. Haifeng, J. Xiaoqing, Y. Jianyi, Z. Qiang, Y. Tianbao, W. Minghua, T. Yu, and T. Yu, "Wavelength-selective optical waveguide isolator based on nonreciprocal ring-coupled Mach-Zehnder interferometer," J. Lightwave Technol. 26, 3166-3172 (2008).
12. L. Myoung Soo, H. In Kag, and K. Byoung Yoon, "Bidirectional wavelength-selective optical isolator," Electron. Lett. 37, 910-912 (2001).

Conclusion

In summary, embodiments of the invention provide methods for making optical isolators and optical isolators. An optical isolator having semiconductor-device dimensions in accordance with one or more embodiments of the present invention comprises a resonator structure carrying forward light in a first direction and backward light in a second direction, and a magneto-optical film, coupled to the resonator structure, the magneto-optical film creating a shift between the forward light and the backward light travelling in the resonator structure, wherein the resonator structure and the magneto-optical film are sized to reside on a semiconductor chip.

Such an optical isolator further optionally comprises the resonator structure being a ring resonator structure, the magneto-optical film being coupled on a top of the ring resonator structure, a coil, coupled to the magneto-optical film, for controlling a magnetic field in the optical isolator, controlling a current in the coil filtering at least one of the forward light and the backward light by wavelength, a width and/or a height of the resonator structure being between 100 nanometers and 10 microns, the magneto-optical film being made from a material selected from a group consisting of yttrium iron garnet (YIG), bismuth iron garnet (BIG), bismuth-substituted gadolinium iron garnet ($BiGa_2Fe_5O_{12}$), and cerium-substituted yttrium iron garnet (Ce:YIG), the magneto-optical film being coupled on an inner diameter top of the resonator structure, and the resonator structure being a double ring resonator structure.

A method for making an optical isolator having semiconductor-device dimensions in accordance with one or more embodiments of the present invention comprises sizing a ring resonator structure for integration on a semiconductor chip, forming the semiconductor-chip sized ring resonator structure to carry forward light in a first direction and backward light in a second direction, and coupling a magneto-optical film to the ring resonator structure, wherein the magneto-optical film creates a shift between the forward light and the backward light travelling in the ring resonator structure.

Such a method further optionally comprises comprising coupling a coil to the magneto-optical film, controlling a current in the coil filtering at least one of the forward light and the backward light by wavelength, the magneto-optical film being made from a material selected from a group consisting of yttrium iron garnet (YIG), bismuth iron garnet (BIG), bismuth-substituted gadolinium iron garnet ($BiGa_2Fe_5O_{12}$), and cerium-substituted yttrium iron garnet (Ce:YIG), and the semiconductor-device dimensions being between 100 nanometers and 10 microns.

A semiconductor optical isolator in accordance with one or more embodiments of the present invention comprises an input semiconductor waveguide on a semiconductor chip, an output semiconductor waveguide on the semiconductor chip, a ring resonator on the semiconductor chip, coupled between the input waveguide and the output waveguide, and a magneto-optical film, coupled to the ring resonator, wherein the magneto-optical film creates a shift between a forward light and a backward light travelling in the resonator structure.

Such an optical isolator further optionally comprises the magneto-optical film being made from a material selected from a group consisting of yttrium iron garnet (YIG), bismuth iron garnet (BIG), bismuth-substituted gadolinium iron garnet ($BiGa_2Fe_5O_{12}$), and cerium-substituted yttrium iron garnet (Ce:YIG), and at least one of a height and a width of the ring resonator is between 100 nanometers and 10 microns.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims attached hereto and the full breadth of equivalents to the claims.

What is claimed is:

1. A optical isolator having semiconductor-device dimensions, comprising:
 a ring resonator structure carrying forward light in a first direction and backward light in a second direction; and
 a magneto-optical film, coupled on an inner diameter top of the ring resonator structure, the magneto-optical film creating a shift between the forward light and the backward light travelling in the ring resonator structure, wherein the ring resonator structure and the magneto-optical film are sized to reside on a semiconductor chip.

2. The optical isolator of claim 1, wherein the magneto-optical film is coupled on a top of the ring resonator structure.

3. The optical isolator of claim 2, further comprising a coil, coupled to the magneto-optical film, for controlling a magnetic field in the optical isolator.

4. The optical isolator of claim 3, wherein controlling a current in the coil filters at least one of the forward light and the backward light by wavelength.

5. The optical isolator of claim 1, wherein a width of the ring resonator structure is between 100 nanometers and 10 microns.

6. The optical isolator of claim 1, wherein a height of the ring resonator structure is between 100 nanometers and 10 microns.

7. The optical isolator of claim 1, wherein the magneto-optical film is made from a material selected from a group consisting of yttrium iron garnet (YIG), bismuth iron garnet (BIG), bismuth-substituted gadolinium iron garnet ($BiGa_2Fe_5O_{12}$), and cerium-substituted yttrium iron garnet (Ce:YIG).

8. The optical isolator of claim 1, wherein a width of the ring resonator structure is between 100 nanometers and 10 microns.

9. The optical isolator of claim 1, wherein a height of the ring resonator structure is between 100 nanometers and 10 microns.

10. The optical isolator of claim 1, wherein the ring resonator structure is a double ring resonator structure.

11. A method for making an optical isolator having semiconductor-device dimensions, comprising:
    sizing a ring resonator structure for integration on a semiconductor chip;
    forming the semiconductor-chip sized ring resonator structure to carry forward light in a first direction and backward light in a second direction; and
    coupling a magneto-optical film on an inner diameter top of the ring resonator structure, wherein the magneto-optical film creates a shift between the forward light and the backward light travelling in the ring resonator structure.

12. The method of claim 11, further comprising coupling a coil to the magneto-optical film.

13. The method of claim 12, wherein controlling a current in the coil filters at least one of the forward light and the backward light by wavelength.

14. The method of claim 11, wherein the magneto-optical film is made from a material selected from a group consisting of yttrium iron garnet (YIG), bismuth iron garnet (BIG), bismuth-substituted gadolinium iron garnet ($BiGa_2Fe_5O_{12}$), and cerium -substituted yttrium iron garnet (Ce:YIG).

15. The method of claim 11, wherein the semiconductor-device dimensions are between 100 nanometers and 10 microns.

16. A semiconductor optical isolator, comprising:
    an input semiconductor waveguide on a semiconductor chip;
    an output semiconductor waveguide on the semiconductor chip;
    a ring resonator on the semiconductor chip, coupled between the input waveguide and the output waveguide; and
    a magneto-optical film, coupled on an inner diameter top of the ring resonator, wherein the magneto-optical film creates a shift between a forward light and a backward light travelling in the resonator structure.

17. The semiconductor optical isolator of claim 16, wherein the magneto-optical film is made from a material selected from a group consisting of yttrium iron garnet (YIG), bismuth iron garnet (BIG), bismuth-substituted gadolinium iron garnet ($BiGa_2Fe_5O_{12}$), and cerium-substituted yttrium iron garnet (Ce:YIG).

18. The semiconductor optical isolator of claim 16, wherein at least one of a height and a width of the ring resonator is between 100 nanometers and 10 microns.

\* \* \* \* \*